May 8, 1962  L. J. COLLINS  3,032,877
DRAINER FOR CURD AND THE LIKE
Filed May 4, 1959
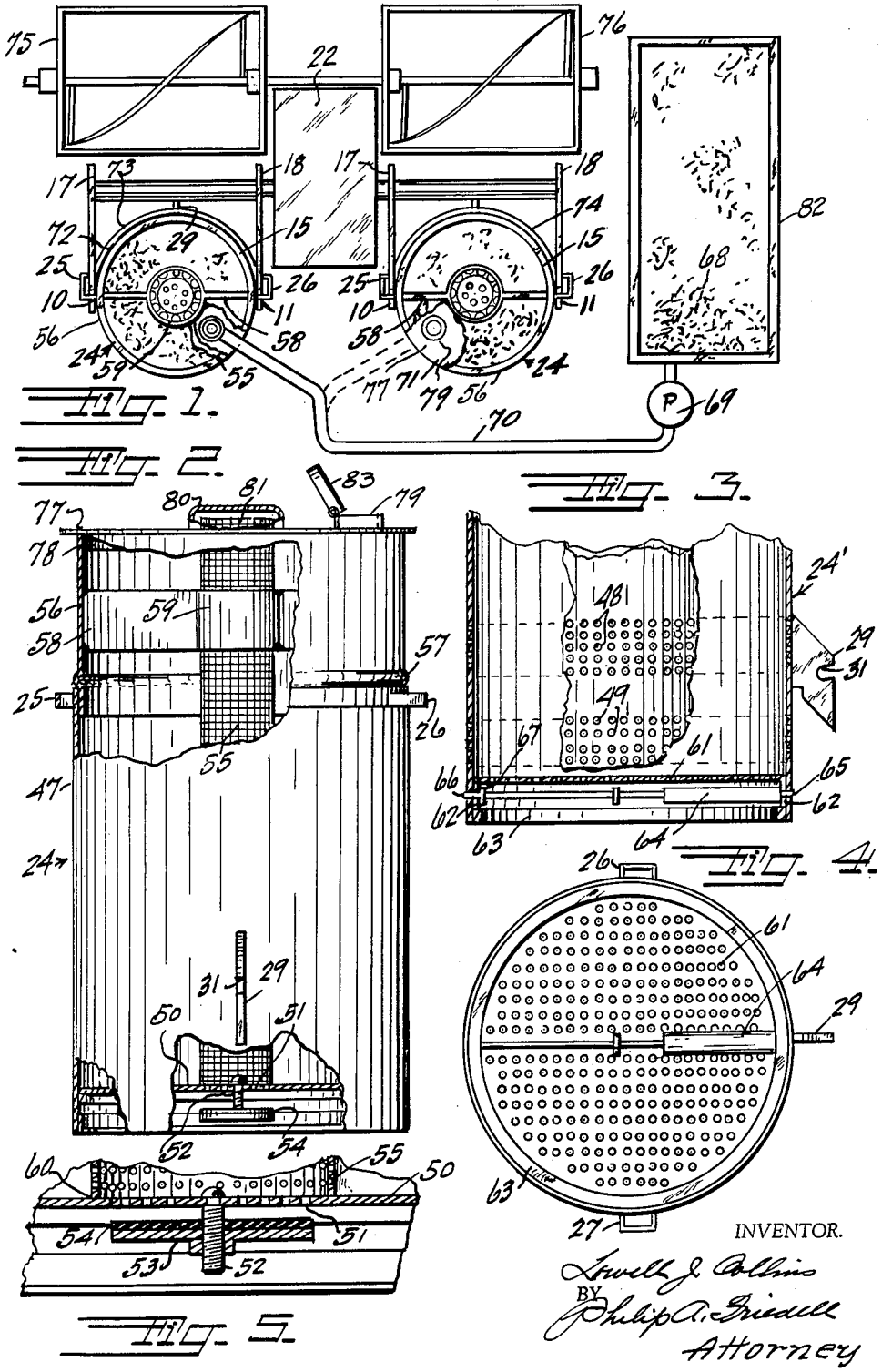
INVENTOR.
Lowell J. Collins
BY Philip A. Friedell
Attorney

United States Patent Office 3,032,877
Patented May 8, 1962

3,032,877
DRAINER FOR CURD AND THE LIKE
Lowell J. Collins, 938 61st St., Oakland 8, Calif.
Filed May 4, 1959, Ser. No. 810,774
7 Claims. (Cl. 31—46)

This invention relates to improvements in the method of preparing curd for the manufacture of cottage cheese, and provides for producing a curd of minimum acid content compatible with a low bacteria count, and unlike the conventional methods of preparing the curd in which the wash water is drained from the curd in the wash vats which are relatively shallow and have an excessively large area exposed to atmosphere to permit the drained curd to be contaminated by the dust and bacteria in the air, my method transfers the curd with the wash water to a drainer where exposure to air is an absolute minimum as to area and elapsed time of draining, in view of the rapid drainer, which is particularly designed for carrying out the method. In view of the rapid draining in a confined space, and the compacting of the curd because of the height of the column of curd and its weight, an average decrease of 85% in bacteria count or spoilage organisms results, producing a more palatable cottage cheese of improved flavor and extended keeping qualities.

The objects and advantages of the invention are as follows:

First, to provide a new method of preparing curd for the manufacture of cottage cheese in which the curd is exposed to an absolute minimum of air and the dust and organisms carried thereby.

Second, to provide a method as defined in which the curd with its wash water are transferred for rapid draining with an absolute minimum area exposed to the air.

Third, to provide a drainer for carrying out the method in which draining is preferably restricted to the interior of the receptacle receiving the curd with its wash water from the wash vats.

Fourth, to provide rapid transfer means for transferring the drained curd to the mixers for producing cottage cheese of minimum bacteria and spoilage organism count.

In describing the invention reference will be had to the accompanying drawings, in which:

FIG. 1 is a top plan view of the invention with parts broken away.

FIG. 2 is a rear elevation of a drainer specifically designed for carrying out my method, and is partly shown in section with portions of the wall broken away and is drawn to an enlarged scale.

FIG. 3 is a fragmentary sectional elevation of a modification of the invention, drawn to an enlarged scale.

FIG. 4 is a bottom plan view of FIG. 3.

FIG. 5 is a fragmentary sectional view showing the bottom gate or closure for the drainer illustrated in FIG. 2 and is drawn to an enlarged scale.

This application is an improvement of the drainage containers disclosed in my copending application Serial Number 732,886, filed May 5, 1958, now Patent No. 2,926,803, for Automatic Container Locking and Unlocking Cradle for Elevators and Container Therefor, the same reference numbers being used as in the application just mentioned, and is used in connection with the instant invention for rapid transfer of the washed and drained curd to the cottage cheese mixers, the uprights of the cradle being indicated at 10 and 11 and the semi-circular bands being indicated at 15, the uprights 10 and 11 being spaced, and the semicircular bands being of suitable radius to receive the containers.

The uprights 10 and 11 engage the handles 25 and 26 on the container, and carrier shaft bearing plates 17 and 18 project rearwardly from the uprights and are fixed to the carrier shaft 21 which projects from the elevator housing 22, the operation of the cradles being fully disclosed in the previously mentioned application.

For a better understanding of the method, it will be best to describe the container which is particularly suited, and which consists of the cylindrical shell 24 having imperforate walls 47, and handles 25 and 26, and also the locking plate 29 having the recess 31 for cooperation with the locking means covered by the previously mentioned application of which this is an improvement.

The bottom 50 is provided with passages in the central portion only as indicated at 51 and limited to the confines of the axial screen 55.

The valve stud 52 is fixed centrally of the bottom and has a valve 53 which is provided with a resilient facing 54 such as live rubber to seal the passages or perforations to terminate draining at the proper point to maintain the desired moisture content in the drained curd.

For draining, the valve is merely rotated to provide space between the face of the valve and the bottom of the container as illustrated, to permit passage of the drainings through the passages 51, and when draining has proceeded to the predetermined moisture content, the valve is rotated in the opposite direction to contact with the bottom of the container to close the passages.

The axial screen 55 may be formed of screen material or of sheet metal of plastic with closely spaced perforations formed throughout its height, and is removably supported in the strainer head 56 which is provided at its lower end with insertion limiting means such as the bead 57, by the spider 58 which is fixed to the inner walls of the drainer head by any suitable method such as welding, and being formed of two arms which are formed semicircularly in opposition at their inner ends and fixed together to form the circular passage portion 59 in which the axial screen fits closely but is slidable, for supporting the screen, permit the screen to rest on the bottom of the container, and locate the screen to encompass the passages in the central portion of the bottom as indicated at 60.

The drainer extension 56 is provided with a removable head 77 having a depending circular member to fit within the top of the drainer extension as indicated at 78, and has an inlet 79, and a cap 80 which clears the upward extension 81 of the axial screen. Thus the only access the atmosphere has to the interior of the drainer is through the intake 79, and it is practically sealed by the conduit 70 during the filling operation, with air actually being expelled as the container is filled. This extension increases the capacity to such an extent as to leave the container practically filled with drained curd.

Another type of drainer is illustrated fragmentarily in FIGS. 3 and 4, the drainer proper consisting of the shell 24' having a series of spaced perforated annular bands with intervening imperforate bands. This type will drain more rapidly but does not so completely isolate the curd from the atmosphere, and therefore is not as desirable as the bacteria and spoilage organisms would be proportionately increased to detriment of the product.

The bottom 61 is formed of screen material or of sheet material perforated throughout its extent, and has an annular depending flange 62 which rests on the inturned flange or ring 63, and is removably secured in place by the locking element consisting of a spring barrel 64 having a plunger and having a pin 65 at the end of the barrel and a second pin 66 at the end of the plunger and which pass through registrable holes formed in the lower end of the container side walls, and the depending flange 62; stops 67 being provided to limit insertion. The spaced perforate bands are indicated at 48 and 49, and the axial screen and drainer extension can be used with this modified form of drainer.

The customary method in use for washing and preparing curd consists in washing the curd in relatively shallow vats of excessive area, draining the wash water from the vats followed by transfer of the curd to the cottage cheese mixers, thus providing extensive exposure of the curd to atmosphere and consequently to the bacteria and other spoilage organisms and dust in the air.

My method contemplates maintaining the curd, from a time before draining has started, until it is ready to be transferred to the mixer, isolated as thoroughly as possible from the atmosphere, thus providing a more palatable and flavorful product with keeping qualities greatly increased, and consists in transferring the curd 68 with its wash water from the vats 82 and draining out of contact with the atmosphere, followed by prompt transfer of the drained curd to the mixers, and is indicated as transferred by the pump 69 to a drainer 71 or 72 located within the cradle 73 or 74 and provided with the drainer extension 56 and cover 77, the conduit 70 discharging through the inlet 79, filling the container and extension to the top, which when drained will leave the container filled with compacted curd because of the weight of the curd and the height of the column, and after the curd has drained to the predetermined desired water content, the valve 53, 54 is closed. All of these operations take place with the drainer in position within one of the cradles as indicated in FIG. 1, so that, as soon as the drainer extension and axial screen are removed, the elevator 22 can be put into operation and elevate the container and dump the curd into the mixers 75 and 76. With a hinged cover 83 provided for the inlet 79, both containers can be filled and drained, and the inlet cover on the first closed until the second container is ready, and both transferred to the mixers.

In this process the washwater for the curd indicated at 68 is maintained as closely as possible at 34 degrees Fahrenheit.

I claim:

1. A drainer for curd comprising an imperforate shell having a bottom provided with a perforate central portion to provide a discharge for drainage water and a valve support, a valve for sealing and axially supported by said perforate central portion, and an axial screen having a diameter to encompass said perforate central portion and extending upwardly above the top of the shell to provide against flow of curd with wash water thereinto during filling of the shell, and for drainage of wash water from the curd limited to the axial screen and in turn terminated by closure of the valve against the perforate central portion.

2. A drainer as defined in claim 1, a drainer extension for increasing the height of the drainer during the filling period and having its lower end closely fitting in the top of the drainer and having a spider having an axial collar with the axial screen insertable therethrough for centering relative to the perforate central portion, with the screen having a height to extend above the top of the drainer extension, and a cover for said drainer extension and having a passage for the upper end of the screen, with the drainer extension and axial screen removable at will upon termination of draining to facilitate emptying of the curd from the shell.

3. A drainer for draining wash water from curd substantially isolated from the atmosphere comprising an imperforate shell having a top and a bottom end, a bottom supported in said bottom end and having passages limited to a central portion, a valve manually adjustable to seal the passages in said central portion, an axial screen having a diameter to encompass said portion and extending upwardly above the top of said shell, a drainer extension having a lower end closely fitting in said top and including stop means for limiting insertion, a spider mounted in said drainer extension and having an axial collar for slidably receiving and supporting said axial screen with the lower end of the screen resting on said bottom in an encompassing position about the said central portion, whereby filling to the top of the drainer extension with curd with its wash water will provide a substantially filled drainer with drained compacted curd.

4. A structure as defined in claim 3, said axial screen extending from said bottom to a plane above the top of the drainer extension, and a cover for said drainer extension and having a passage for the axial screen extending above the top thereof whereby the filling capacity is greatly increased by the drainer extension, with the drainer extension and axial screen removable upon termination of draining for expediting complete discharge of the drained curd from the obstruction free shell.

5. A drainer for curd comprising a container having walls interiorly free of obstructions and having a bottom wall having a limited portion provided with passages for wash water, a tubular screen insertable and removable at will and having a cross-sectional area to enclose said limited portion and a height in excess of the interior height of the container to prevent overflow of curd with wash water thereinto during filling of the container; removal of the screen following completion of the draining operation providing an obstructionless interior for the container for unrestricted emptying of the curd.

6. A structure as defined in claim 5, a shell having an upper end and a lower end, with the lower end fitting in the top of the container to provide temporary excess filling capacity for increasing the quantity of curd drained for each operation, and a spider spanning the interior of said shell and having a collar to slidably receive said screen, with said screen having a height in excess of the combined height of container and shell, removal of the screen and shell with its spider providing the said obstructionless interior.

7. A structure as defined in claim 5, in which said limited portion is provided with a plurality of passages formed about an axial portion with the axial portion providing a valve support, and a valve including a threaded member dependently secured in said valve support and having a valve disc threadedly adjustable thereon to close said passages at the completion of the draining operation.

References Cited in the file of this patent

UNITED STATES PATENTS

| | | |
|---|---|---|
| 594,635 | Lynch | Nov. 30, 1897 |
| 929,384 | Brown et al. | July 27, 1909 |
| 1,044,851 | Behm | Nov. 19, 1912 |
| 2,160,159 | Lundstedt et al. | May 30, 1939 |
| 2,536,054 | Harrington | Jan. 2, 1951 |
| 2,774,140 | Nessler et al. | Dec. 18, 1956 |
| 2,851,363 | Kielsmeier | Sept. 9, 1958 |